United States Patent
Alexander (10) Patent No.: US 7,916,070 B2
(45) Date of Patent: *Mar. 29, 2011

(54) TIGHT COUPLING OF GPS AND NAVIGATION ESTIMATES WITH REDUCER OR ELIMINATED INERTIAL MEASUREMENT UNIT DATA

(75) Inventor: Steven B. Alexander, Orange, CA (US)

(73) Assignee: L-3 Communications Corporation, Anaheim, CA (US)

(*) Notice: Subject to any disclaimer, the term of this patent is extended or adjusted under 35 U.S.C. 154(b) by 130 days.

This patent is subject to a terminal disclaimer.

(21) Appl. No.: 11/413,635

(22) Filed: Apr. 28, 2006

(65) Prior Publication Data

US 2007/0252754 A1 Nov. 1, 2007

(51) Int. Cl.
G01S 19/47 (2010.01)
(52) U.S. Cl. .................... 342/357.3
(58) Field of Classification Search . 342/357.01–357.17
See application file for complete search history.

(56) References Cited

U.S. PATENT DOCUMENTS

| | | | |
|---|---|---|---|
| 5,983,160 A | 11/1999 | Horslund et al. | |
| 6,331,835 B1 | 12/2001 | Gustafson et al. | |
| 6,456,906 B1* | 9/2002 | Hua | 701/13 |
| 6,516,021 B1 | 2/2003 | Abbott et al. | |
| 6,697,736 B2* | 2/2004 | Lin | 701/214 |
| 7,027,918 B2* | 4/2006 | Zimmerman et al. | 701/213 |
| 7,061,425 B2* | 6/2006 | Geier et al. | 342/357.02 |
| 7,274,504 B2* | 9/2007 | Crane et al. | 342/357.14 |
| 2002/0047799 A1* | 4/2002 | Gustafson et al. | 342/357.12 |
| 2006/0015250 A1* | 1/2006 | Kim | 701/213 |
| 2006/0161329 A1 | 7/2006 | Crane et al. | |
| 2007/0096977 A1* | 5/2007 | Lillo et al. | 342/357.02 |

OTHER PUBLICATIONS

Elliott D. Kaplan, Understanding GPS Principles and Applications, 1996, pp. 395-397, Artech House, Inc., Norwood, MA.
J. Beser, et al.; TRUNAV™: A Low-Cost Guidance/Navigation Unit Integrating a SAASM-Based GPS and MEMS IMU in a Deeply Coupled Mechanization; Institution of Navigation (ION) GPS 2002; Sep. 24-27, 2002; pp. 545-555; Portland, OR.

(Continued)

Primary Examiner — Thomas H Tarcza
Assistant Examiner — Nga X Nguyen
(74) Attorney, Agent, or Firm — Knobbe Martens Olson & Bear LLP (57) ABSTRACT

A system and method for generating a navigation solution in high interference and dynamic environments using Global Positioning System (GPS) and navigation such as dead reckoning is described. The system configuration is a multi-satellite tracking loop structure obtained by closing each satellite's tracking loop through a multi-state navigation filter. This generates a robust navigation solution that can track GPS signals in a lower signal to noise ratio than can the standard GPS tightly coupled tracking loops. The system contains an Advanced Tightly Coupled (ATC) tracking processor which accepts early, late, and on-time I and Q data from the GPS signal tracker and outputs vehicle to satellite range, range rate and range acceleration residual measurements to a navigation Kalman filter. The ATC includes nonlinear discriminators which transform I and Q data into residual measurements corrupted by unbiased, additive, and white noise. It also includes an amplitude estimator configured to operate in rapidly changing, high power noise; a measurement noise variance estimator; and a linear residual smoothing filter for input to the navigation filter.

9 Claims, 2 Drawing Sheets

OTHER PUBLICATIONS

S. Gunawardena, et al.; Real Time Implementation of Deeply Integrated Software GPS Receiver and Low Cost IMU for Processing Low-CNR GPS Signals; Institution of Navigation (ION) 60th Annual Meeting/U.S. Air Force Institute of Technology & The U.S. Air Force Research Laboratory, Sensors Directorate; Jun. 7-9, 2004; pp. 108-114; Dayton, OH.

D. Landis, et al.: A Deep Integration Estimator for Urban Ground Navigation; Institute of Electrical and Electronics Engineers (IEEE); 2006; pp. 927-932.

T. Pany, et al.: Deep Integration of Navigation Solution and Signal Processing; Institution of Navigation (ION) Global Navigation Satellite Systems (GNSS) 18th International Technical meeting of the Satellite Division; Sep. 13-16, 2005; pp. 1095-1102; Long Beach, CA.

D. Li, et al.: Kalman Filter Design Strategies for Code Tracking Loop in Ultra-Tight GPS/INS/PL Integration; Institution of Navigation (ION) National Technical Meeting (NTM) 2006; Jan. 18-20, 2006; pp. 984-992; Monterey, CA.

Elliott D. Kaplan; Understanding GPS Principles and Applications; 1996; pp. 386-389; Artech House, Inc.; Norwood, MA.

* cited by examiner

TIGHT COUPLING OF GPS AND NAVIGATION ESTIMATES WITH REDUCER OR ELIMINATED INERTIAL MEASUREMENT UNIT DATA

BACKGROUND OF THE INVENTION

1. Field of the Invention

The invention relates to a new method of combining GPS and navigation estimates based on dead reckoning for the purpose of navigating in the presence of interfering signals.

2. Description of the Related Art

The Global Positioning System has revolutionized navigation. Prior to the twentieth century, land and sea navigation was performed using angle measurements to celestial bodies, magnetic compass measurements, and time measurements from an accurate clock to determine longitude. At the beginning of the twentieth century, the first airplane flight foreshadowed the need for more accurate navigation systems. Radio and inertial navigation systems soon supplanted the old methods.

The GPS concept was developed in the early 1970s as a joint military service project and the first satellite was launched in 1978. GPS satellites transmit time synchronized signals in the L frequency band (approximately 1.5 GHz) using atomic clocks. The signals are BPSK modulated by a spread spectrum ranging code and navigation message. The code, known to the user, is unique for each satellite. The navigation message contains data on satellite ephemeris and clock errors, atmospheric corrections, and general satellite almanac data.

A GPS navigator determines position with time-of-arrival measurements. The navigator correlates a replica of each satellite's code with the received satellite's signal. Accurate knowledge of the code transmit time from each satellite and the receive time at the navigator will determine pseudoranges, ranges which contain an offset because of navigator clock error. Four satellites are the minimum required for determination of a vehicle's three dimensional position and clock offset.

An inertial navigation system, INS, incorporates gyros and accelerometers mounted along three orthogonal axes to measure vehicle angular rates and specific force respectively. An INS measures short term vehicle dynamics and is, therefore, a perfect companion to GPS to achieve high dynamic and high accuracy vehicle navigation.

The following paragraphs describe existing methods to improve accuracy when GPS signals are corrupted by external interference and/or intentional jamming signals. The interference and jamming are assumed to be broadband Gaussian white noise.

Standard GPS receivers employ tracking loops to generate pseudorange and delta pseudorange measurements for each satellite. The GPS signal at the vehicle's antenna is amplified, down converted, and digitized prior to entering the tracking loops. It is a composite signal, containing information from all visible satellites.

In each satellite tracking loop, the incoming carrier signal is mixed with a replica of the carrier to produce in-phase (I) and quadature-phase (Q) signals with a small phase error. These Is and Qs are transformed into an explicit phase error signal, integrated, subsampled, filtered and fed to a numerically controlled oscillator to generate the replica carrier signal. This process is referred to as the carrier tracking loop.

An inner loop correlates the Is and Qs with on time, one half chip early, and one half chip late replica codes for the specific satellite being tracked. The Is and Qs are now only a function of the code correlation and phase error. These are transformed into an explicit pseudorange error signal, integrated, subsampled, filtered, and fed to a numerically controlled oscillator to clock the satellite replica code. This inner loop is referred to as the code tracking loop.

A major tracking loop design tradeoff is the ability to handle high vehicle dynamics and to also track through high interfering noise. One way of solving this problem is to aid the carrier tracking loop with an Inertial Navigation Unit (IMU) and let the carrier loop aid the code loop. The IMU will remove short term dynamics from the tracking loop and thus allow the loop bandwidth to be reduced. Lowering the bandwidth results in greater noise suppression.

The output of each satellite's tracking loop includes pseudorange and delta pseudorange measurements. These, along with satellite ephemeris and IMU measurements, are input to a navigation filter which estimates vehicle position, velocity, attitude, user clock parameters, and IMU error terms. In real-time systems, the navigation filter usually runs at a 1 Hz rate. It sends estimates to the navigation processor, which computes navigation estimates. The navigation estimates are projected along each satellite's line of sight for tracking loop aiding. This configuration is called a tightly coupled system.

Standard GPS carrier and code tracking loops, with aiding from a medium grade IMU, normally break lock at jamming to signal ratios of 47 and 57 dB respectively. For high dynamic vehicles, these maximum jamming ratios can be achieved by aiding the tracking loops with IMU data as described above.

Recently, jamming to signal ratios above 60 dB have been attained by closing the tracking loops through the navigation filter. This multi-satellite tracking loop structure is derived from the maximum likelihood estimate of the pseudorange error given the composite GPS signal at the input to the tracking processor. In this configuration, position and velocity estimates from the navigation processor are projected along each satellite's line of sight to generate range and range rate estimates to each satellite. These drive numerically controlled oscillators whose outputs are mixed with the digitized I and Q data, processed, and input to the navigation filter as residual (measurement−estimated measurement) estimates for each satellite. The navigation filter outputs vehicle trajectory and IMU error estimates to the navigation processor to close the multi-satellite tracking loop.

Because every GPS satellite tracking loop includes the navigation filter, each satellite is integrated with the IMU and other tracked satellites. In this mode the satellites aid each other, and with the IMU, generate a more robust navigation solution. Unfortunately, the power consumed by an IMU system is undesirable in many circumstances. Thus, it is desirable to reduce or eliminate the use of an IMU while still retaining the benefits of navigation estimates to assist tracking in the presence of jamming.

SUMMARY

These and other problems are solved by an Advanced Tightly Coupled (ATC) multi-satellite tracking system for navigation in a high noise environment wherein navigation information is provided, at least in part, by dead reckoning. Nonlinear transformations of I and Q tracker measurements are developed to yield linear measurements of pseudorange and carrier phase errors corrupted by white, additive, and unbiased noise. The system's design parameters are provided by application of linear estimation theory, allowing it to be easily integrated into existing navigation filter designs.

In one embodiment, during real-time operation, the system can handle jamming to signal interference ratios greater than 60 dB. In one embodiment, the system adapts to changing levels of interference and can operate without knowledge of the GPS navigation data bit. After initial GPS signal acquisition, it is possible to transition into the Advanced Tight Coupling mode, although standard tracking loops can still be employed at low jamming to signal ratios.

In one embodiment of the ATC multi-satellite tracking system, the navigation filter outputs vehicle trajectory estimates along with position error estimates based on dead-reckoning and user clock error estimates. In one embodiment, a Kalman filter is used to implement the navigation filter. In a real-time system, the greater the number of filter states the less time will be available for the ATC tracking processor to function. In one embodiment, the navigation filter includes 24 states, and provides processing in less than one tenth of a second.

The navigation filter's error estimates and navigation trajectory estimates are used by the navigation equations to correct the dead reckoning measurements and propagate the vehicle's state between the one second navigation filter's outputs. In one embodiment, the navigation estimates are provided by dead reckoning or techniques based on dead reckoning (e.g., dead reckoning with corrections for acceleration). Satellite ephemeris data, which has been obtained from the navigation message, is combined with the vehicle's position and velocity estimates to determine range and range rate estimates to each satellite. These estimates drive carrier and code numerically controlled oscillators (NCO) to generate replica carrier and code signals.

The replica signals are mixed with the GPS carrier and code signals in a phase de-rotation and correlation process to produce in-phase (I) and quadrature-phase (Q) measurements. These measurements are nonlinear functions of the range measurement error and ambiguous carrier phase error. The carrier phase ambiguity refers to the unknown number of whole cycles from the satellite to the vehicle. The ATC tracking processor estimates residual measurements for the navigation filter from the I and Q data.

The I and Q measurements are functions of amplitude, navigation data bit, correlation function, and sine and cosine, respectively, of the phase error. The correlation function is a known function of the range error, and the noise on the Is and Qs is white, additive, unbiased, and Gaussian.

In one embodiment of the ATC tracking processor, the Is and Qs are first smoothed for a period of time. In one embodiment, such time period corresponds to the amount of time that the navigation data bit is expected to be constant (e.g., approximately 20 milliseconds). The smoothed Is and Qs are then passed through two nonlinear transformations configured according to their linearity and additive noise properties. Since the nonlinear transformations tend to increase the measurement noise relative to the Is and Qs, it is desirable to smooth the Is and Qs before applying the transformation.

The range residual transformation, made up of the early and late Is and Qs, produces a measurement that is a linear function of range residual error. The range rate residual transformation, made up of the prompt Is and Qs, produces a measurement that is a linear function of range rate residual error, however, the square of the correlation function remains as a multiplier. Both transformed measurements are also multiplied by the square of the I and Q amplitude. The noise on each is additive, zero mean, and white with a variance given by a deterministic equation dominated by the variance of the I and Q noise. To describe these transformed measurements and their noise statistics, the I and Q amplitude and noise variance are estimated.

The range and range rate transformed measurements, typically generated, for example, at a 20 millisecond rate, are processed in order to obtain residual error estimates at desired intervals for the navigation filter. In one embodiment, the residual error estimates are provided at approximately one second intervals. In one embodiment, a three-state phase error estimator processes the measurements. Since total phase scales to range through the carrier signal wavelength, knowledge of the phase error yields the desired residual measurements for the navigation filter.

The phase error states (phase, phase rate, and phase acceleration) are propagated assuming that the phase acceleration is constant. This results in a linear dynamic equation with a constant transition matrix. There are four measurements for each satellite, range and range rate for L1 and L2 signals. The range measurement matrix is a constant scaled by the I and Q amplitude, whereas the range rate measurement matrix is also scaled by the correlation function. Since this is a relatively slowly varying function, it is assumed constant over the one second processing interval. As previously stated, the measurement noise matrix in low signal to noise environments is dominated by the I and Q noise variance.

Given the above dynamics and measurement process, a linear, unbiased estimator can be realized using a Kalman filter. The primary approximation is due to the measurement noise, which is unbiased, additive, and white but not Gaussian. In one embodiment, the measurement noise variance in the filter is increased to account for this.

The constant, linear state transition and the linear, and approximately constant measurement relations, allow the phase error estimator to handle relatively large magnitude swings in the measurements in the presence of relatively high noise. It is the ability to estimate the statistics of the noise that allows the parameters in the phase error estimator to be adjusted properly.

The amplitude on the Is and Qs can rapidly change due to variations in antenna gain, radio frequency signal processing (amplifiers, mixers, filters), and the automatic gain control amplifier, which maintains a constant input to the analog to digital converter. A measurement of the amplitude can be obtained from the early and late Is and Qs, but it becomes noisy as the signal to noise ratio decreases. However, the satellite signal amplitude at the GPS antenna input is constant over a reasonable length of time.

In one embodiment, a one state, one measurement, Kalman filter is designed for the L1 and L2 signals for each satellite. The approximately constant satellite signal amplitude at the antenna is the state to be estimated. The measurements are the noisy I and Q amplitudes calculated from the early and late Is and Qs. The measurements are related to the state by the total system gain from the antenna to the analog to digital converter. The total system gain is approximately known from design parameters and can be improved in real-time by calibration and temperature compensation.

When the interference noise is low, the I and Q amplitude measurement is projected back through the system gain to estimate the constant satellite signal amplitude. Then, when the noise increases, the satellite signal amplitude estimate is projected forward through the system gain to estimate the I and Q amplitude. This process produces an approximately nonrandom multiplier for the range and range rate residual error measurements during periods of high signal interference. This helps the phase error estimator perform properly in a relatively high noise environment.

The noise variance on the Is and Qs is computed in part by assuming that each satellite's processing channel has one correlator sufficiently away from the code that it contains only noise. Since the noise is either from the radio signal processing channel or from external interference, it is the same for all satellites. However, each satellite's code is a pseudo random sequence, which when correlated with the input noise, produces uncorrelated noise between the satellites with equal variance. In one embodiment, a running average filter is used to compute the noise variance using the noise correlator signals from all satellite channels.

BRIEF DESCRIPTION OF THE DRAWINGS

The various features and advantages of the invention will be apparent from the disclosure herein as illustrated in the accompanying drawings.

DETAILED DESCRIPTION

Figure 1:
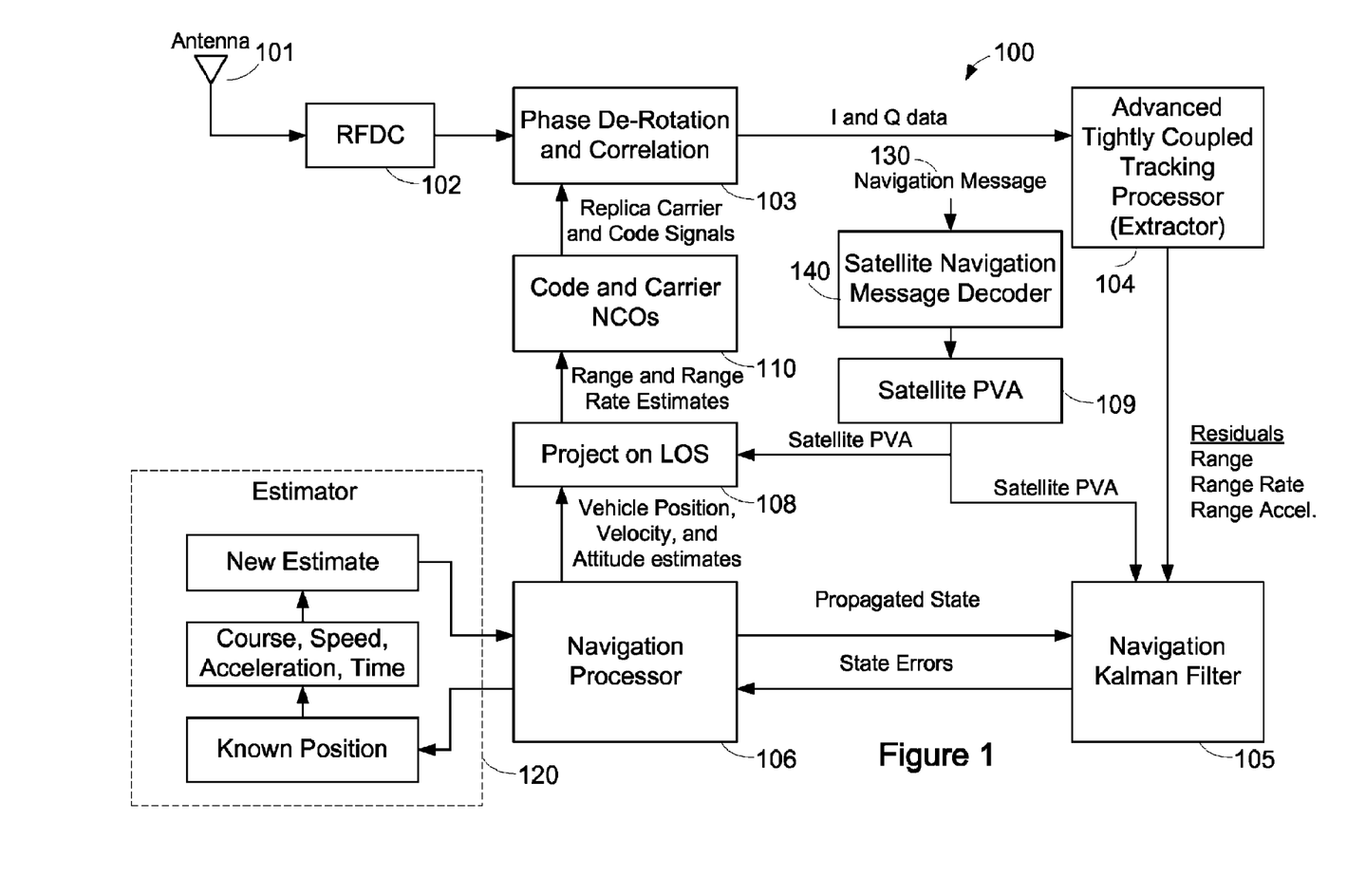
FIG. 1 is a block diagram of a system for coupling GPS and an navigation system based on dead reckoning.

FIG. 1 is a block diagram showing multi-satellite tracking system 100. In the system 100, satellite navigation signals are received by an antenna 101 and provided to a Radio Frequency Down Converter (RFDC) 102. Downconverted signals from the RFDC 102 are provided to a phase de-rotation and correlation block 103. De-rotated and correlated signals from block 103 are provided to an ATC tracking processor 104. The ATC tracking processor 104 provides residuals of range, range rate and range acceleration to a 24-state navigation Kalman filter 105. Navigation state errors from the Kalman filter 105 are provided to a navigation processor block 106. Navigation estimates are based on dead reckoning in which the receiver position and velocity are propagated based on the current estimate of acceleration, velocity and position. The navigation processor block 106 provides corrected navigation state information to a projection block 108 and propagated state information to the Kalman filter 105. Satellite Position, Velocity, and Acceleration (PVA) data are provided from a PVA block 109 to the projection block 108 and to the Kalman filter 105. The projection block 108 projects the navigation data onto the receiver-satellite line of sight and provides the projected data to a Numerical Controlled Oscillator (NCO) block 110. The NCO block 110 provides code and carrier NCO signals to the phase de-rotation and correlation block 103, thereby closing the code and carrier tracking loops.

After initial GPS signal acquisition, it is possible to transition into the Advanced Tight Coupling mode, although standard tracking loops can still be employed at low jamming to signal ratios.

The navigation filter's error estimates and navigation trajectory estimates are used by the navigation equations to correct the dead reckoning measurements and propagate the vehicle's state between the one second navigation filter's outputs. In one embodiment, the navigation estimates are provided by dead reckoning or techniques based on dead reckoning (e.g., dead reckoning with corrections for acceleration). Satellite ephemeris data 109, which has been obtained 140 from the navigation message 130, is combined 108 with the vehicle's position and velocity estimates to determine range and range rate estimates to each satellite. These estimates drive carrier and code numerically controlled oscillators (NCO) 110 to generate replica carrier and code signals.

One embodiment includes at least: a satellite navigation message decoder 140 to provide satellite position, velocity, and acceleration (PVA) data 109 to the satellite line of sight projection algorithm 108 and to the Kalman filter 105; and a satellite line or sight projection algorithm to project the navigation data 109 onto the satellite line of sight, generate range and range rate estimates, and provide these estimates to one or more Numerically Controlled Oscillators 110 configured to provide code and carrier signals for GPS signal phase de-rotation and correlation.

The replica signals are mixed with the GPS carrier and code signals in a phase de-rotation and correlation process 103 to produce in-phase (I) and quadrature-phase (Q) measurements. These measurements are nonlinear functions of the range measurement error and ambiguous carrier phase error. The carrier phase ambiguity refers to the unknown number of whole cycles from the satellite to the vehicle. The ATC tracking processor 104 estimates residual measurements for the navigation filter from the I and Q data.

In one embodiment, the navigation processor 106 uses dead reckoning to compute a navigation estimate over a desired time interval. In one embodiment, the navigation system 106 computes a dead reckoning navigation estimate, or position estimate, by advancing a known position using course, speed, and time. In one embodiment, the dead reckoning calculation includes computing a navigation estimate by multiplying a velocity vector by a measured time interval, the multiplication thus producing a position vector. In one embodiment, dead reckoning calculation includes corrections for acceleration. In one embodiment, the navigation processor 106 includes one or more accelerometers that are intermittently powered to provide acceleration measurements for use in dead reckoning calculations. In one embodiment, the navigation processor 106 includes an Inertial Measurement Unit (IMU) that is used when sufficient power is available and a dead reckoning estimator 120 that is used as a backup when the IMU fails or when there is insufficient power for the IMU.

Figure 2:
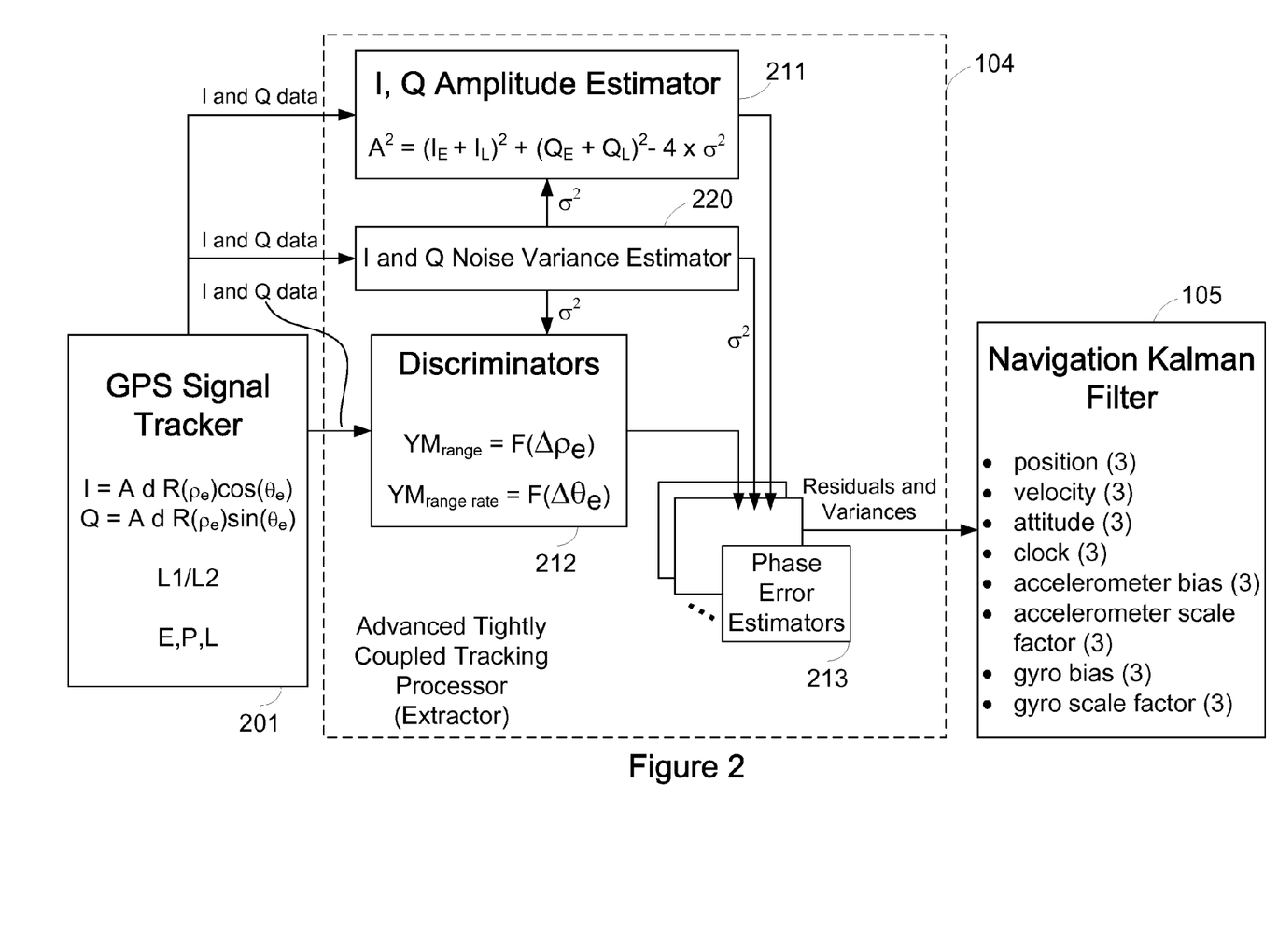
FIG. 2 is block diagram showing one embodiment of a tracking processor.

FIG. 2 is a block diagram of the ATC tracking processor 104. In the tracking processor 104, a GPS signal tracker 201 provides early and late Is and Qs to an amplitude estimator 211. The GPS signal tracker 201 also provides data to one or more discriminators 212. The amplitude estimator 211 provides satellite signal amplitude estimates to one or more phase error estimators 213. Residuals and variances are provided to a navigation filter 105. The navigation filter 105 computes estimates for vehicle position, velocity, attitude, clock, accelerometer bias, accelerometer scale factor, gyro bias, and gyro scale factor.

In the system 100, all satellite signals and navigation estimates are combined in a single process to estimate the vehicle trajectory and associated system error parameters. This structure follows from a maximum likelihood estimator of GPS signal parameters.

The navigation filter 105 estimates vehicle position, velocity, attitude, clock and dead reckoning error parameters, and the like, at a relatively low rate. In one embodiment, the navigation filter 105 provides estimates at intervals of one second. The estimated vehicle angular rate and specific force measurements are compensated and adjusted using the estimated error parameters. The measurements are then integrated by the navigation equations in the navigation processor block 106 to obtain vehicle position, velocity, and attitude estimates at a relatively higher rate (e.g., 100 Hz).

These estimates are projected along each satellite's line of sight to obtain range and range rate estimates, which are used to drive the carrier and code NCOs 110. The carrier NCO output is mixed with the GPS signal phase, resulting in a phase error, $\theta_e$. The code NCO 110 drives the code generator. The generator's output is correlated with the incoming GPS code, resulting in a correlation magnitude between zero and one.

This process generates the following I and Q functions for each satellite at the relatively higher rate (e.g., at a 1 KHz rate), for prompt (P), early (E), and late (L) signals:

$I_P = AdR(\rho_e)\cos(\theta_e) + \eta_P$ $Q_P = AdR(\rho_e)\sin(\theta_e) + \epsilon_P$ $I_E = AdR(\rho_e - b/2)\cos(\theta_e) + \eta_E$ $Q_E = AdR(\rho_e - b/2)\sin(\theta_e) + \epsilon_E$ $I_L = AdR(\rho_e + b/2)\cos(\theta_e) + \eta_L$ $Q_L = AdR(\rho_e + b/2)\sin(\theta_e) + \epsilon_L$ where:
$R(\rho_e) = \max[1 - (|\rho_e|/b), 0]$,
b=code chip in meters (=29.3 m for P code),
A=amplitude, different for L1 and L2,
d=BPSK navigation data bit, constant for 20 ms,
$\rho_e$=residual (measurement–estimate) range error, meters,
$\theta_e$=L1 residual phase error, radians–different for L2
$\eta, \epsilon$=additive, white, Gaussian noise, zero-mean, variance $\sigma_{I,Q}^2$.

The additive, white, zero-mean, Gaussian noise is assumed to be uncorrelated (approximately) between Is and Qs at the same time.

In the GPS signal tracker 201, the early and late Is and Qs are smoothed for a desired time period (e.g., 20 ms in one embodiment) while the data bit is assumed to be constant and assuming that $\rho_e$ and $\theta_e$ are relatively constant over that interval. The result has the same form as the above equations but with the noise variance changed to $\sigma_{ELS} = \sigma_{IQ}/\sqrt{20}$ In one embodiment, the prompt Is and Qs are smoothed for 10 ms each in a 20 ms interval to yield:

$I_P, Q_P, I_{PO}, Q_{PO}$ with noise variance $\sigma_{PS} = \sigma_{IQ}/\sqrt{10}$ To close the tracking loop through the navigation filter 105, the range and range rate residuals are computed by the phase error estimators 213 and provided to the navigation filter 105. In one embodiment, the estimates are provided to the navigation filter 105 at approximately 1 Hz intervals. These residuals are estimated from the smoothed Is and Qs by first transforming them into measurements of $\rho_e$ and $\Delta\theta_e$ and then applying a Kalman filter to process the measurements to obtain the 1 Hz navigation filter residual estimates.

The ATC multi-satellite tracking system can estimate the vehicle's trajectory using estimates based on dead reckoning and GPS measurements in the presence of broadband jamming noise. If the Is and Qs were directly employed as measurements to estimate residuals for the navigation filter, the phase error would render them ambiguous when it exceeded $2\pi$ radians. This corresponds to a maximum range residual of 0.19 meters (the wavelength of L1), which would easily be exceeded in the presence of any significant jamming noise. The following nonlinear transformations generate $\rho_e$ and $\Delta\theta_e$ measurements that are not ambiguous for large tracking errors.

Range residual measurements for L1 are given by:

$$Y_R = I_E^2 + Q_E^2 - I_L^2 - Q_L^2 \quad (1)$$
$$= A^2(2\rho_e/b) + \xi \text{ for } |\rho_e| \leq b/2$$

$$E(\xi) = 0 \quad (2)$$
$$E(\xi^2) = 8\sigma_{ELS}^4 + 4A^2\sigma_{ELS}^2 F(\rho_e)$$
$$F(\rho_e) = 2\rho_e^2/b^2 + 1/2$$

Since $1/2 \leq F(\rho_e) \leq 1$, a relatively conservative estimate is $F(\rho_e) = 1$ Range rate residual measurements for L1 are given by:

$$Y_{RR} = I_P Q_{PO} - I_{PO} Q_P$$
$$= A^2 R^2(\rho_e)\sin(\theta_{eo} - \theta_e) + \gamma$$

For a small $\theta_e$ change over half an I, Q smoothing interval, $\Delta t/2$ $$Y_{RR} \approx -A^2 R^2(\rho_e)\dot{\theta}_e(\Delta t/2) + \gamma \quad (3)$$

$E(\gamma) = 0$ $$E(\gamma^2) = 2\sigma_{PS}^4 + 2A^2 R^2(\rho_e)\sigma_{PS}^2 \quad (4)$$

for $|\rho_e| \leq b/2$, $0.25 \leq R^2(\rho_e) \leq 1$.

A similar measurement set is generated for the GPS L2 carrier signal, resulting in a total of four measurements at each smoothing time interval.

The above measurements, $Y_R$ and $Y_{RR}$, have desirable properties relative to estimating satellite residual errors for input to the navigation filter.

In a noiseless environment:

Residual range error=true range–estimated range=$\rho_e$=
$(\lambda/2\pi)\theta_e$     (5)

where $\lambda$ is the L1 carrier wavelength and $\theta_e$ is the L1 carrier phase error.

Further, in the noiseless environment:

Residual range rate error=true range rate–estimated
range rate=$\dot{\rho}_e = (\lambda/2\pi)\dot{\theta}_e$     (6)

The measurements $Y_R$ and $Y_{RR}$ are linear in $\rho_e$ and $\dot{\theta}_e$ respectively with coefficients that are functions of the I and Q amplitude, A. The dependence of $Y_{RR}$ on $R(\rho_e)$ is discussed below. The measurement noise terms, $\xi$ and $\gamma$, are additive, unbiased, and white. Although they are non-Gaussian, they can still be processed with a Kalman filter by slightly increasing the noise standard deviation.

The negative aspect of the nonlinear measurement transformations is that they significantly increase the measurement noise. For this reason, it is desirable to smooth the Is and Qs before they are transformed. The GPS navigation data bit rate of 50 Hz limits the smoothing interval to 20 ms for GPS systems.

When broadband jamming noise is present, the I and Q amplitude, A, can be relatively accurately estimated by an offline process. If the navigation filter could be run at 50 Hz instead of 1 Hz, then solving equations (1), (3) and (6) for $\rho_e$ and $\dot{\rho}_e$ yields residual error estimates that could be directly input to the navigation filter with appropriately modified measurement noise variances given by equations (2) and (4). The navigation filter's previous estimate of $\rho_e$ can be used to determine $R(\rho_e)$ in equations (3) and (4).

When the navigation filter is run at 1 Hz, which is its normal rate in an embedded processor, the 1 Hz measurement residuals are typically estimated from the 50 Hz measurements given by equations (1) and (3). This estimation can be performed by a Kalman filter which employs a relatively constant phase error acceleration model for its dynamics.

The L1 phase error estimator has states:

$$X = [\theta_e \; \dot{\theta}_e \; \ddot{\theta}_e]^T$$

where:
$\theta_e$=measured phase−navigation estimated phase for the GPS L1 frequency.
The state model is:
$\dddot{\theta}_e$=constant
The dynamics equation is therefore:

$$X(t_i) = F \cdot X(t_{i-1})$$

where:
$F(1,2)=F(2,3)=\Delta t$, $F(1,3)=\Delta t^2/2$
$\Delta t=t_i-t_{i-1}$

Since both L1 and L2 signals are assumed available, ionospheric error and error rate terms can be added to the state vector, $X_e$. These errors are observable because of the sign reversal in the code and carrier phase measurements. However, in a high jamming environment, ionospheric errors typically cannot easily be separated from the total phase measurements during this filter's one second processing time.

The measurement vector is given by:

$$Y(t_i) = [Y_R(f_1) Y_{RR}(f_1) Y_R(f_2) Y_{RR}(f_2)]^T$$

where:
$Y_R$ and $Y_{RR}$ are defined by equations (1) and (3), and
$f_1$ and $f_2$ represent GPS L1 (1575.42 MHz) and L2 (1227.6 MHz).
The measurement equation is:

$$Y(t_i) = H \cdot X(t_i) + \Gamma(t_i)$$

where:
$\Gamma(t_i) = [\xi_1 \; \gamma_1 \; \xi_2 \; \gamma_2]^T$, the first and second noise pairs correspond to L1 and L2,
H=Zeros(4,3), and
$H(1,1) = (2A_1^2/b) \cdot (\lambda/2\pi)$,
$H(2,2) = -A_1^2 R^2(\hat{\rho}_e) \cdot \Delta t/2$
$H(3,1) = (2A_2^2/b) \cdot (\lambda/2\pi)$,
$H(4,2) = -A_2^2 R^2(\hat{\rho}_e) \cdot \Delta t/2 \cdot (f_2/f_1)$,
  $A_1$ and $A_2$ correspond to I and Q amplitudes for L1 and L2 channels respectively, and $\hat{\rho}_e$ represents the present best estimate of $\rho_e$ The measurement noise variance is given by $$R(t_i) = E(\Gamma \Gamma^T)$$

where:
R is diagonal since the noise terms are not correlated with each other,
  R(1,1), R(3,3)=equation (2) for L1 and L2 respectively, and
  R(2,2), R(4,4)=equation (4) for L1 and L2 respectively.
To completely determine the measurement process, the following values are estimated in blocks 211 and 220 as described below.

$\sigma_{IQ}^2$=variance of the additive noise on the Is and Qs (block 220)
$A_1$ and $A_2$=I and Q amplitudes for L1 and L2 (block 211)

The ATC 104 includes nonlinear discriminators 212 which transform I and Q data into linear residual measurements corrupted by unbiased, additive, and white noise. It also includes an amplitude estimator 211 configured to operate in rapidly changing, high power noise; a measurement noise variance estimator 220; and a linear residual smoothing filter (GPS signal tracker) 201 for input to the navigation filter 105.

The operation of the phase error estimator for each satellite is described in the following paragraphs.

At discrete time intervals (e.g., one second intervals in one embodiment), the navigation filter generates new estimates of the vehicle trajectory and dead reckoning-based error estimates, which through the navigation equations, run each of the satellite's NCOs. This causes the phase error states defined above to change. Therefore, the phase error estimator must be reinitialized after each navigation filter cycle.

The best estimate of the initial phase error states is zero. Thus:

$$\bar{x}(t_0) = [0 0 0]^T$$

The initial covariance matrix (diagonal), is determined by the maximum expected phase, phase rate, and phase acceleration errors at start of each one second interval.

$$\bar{P}(t_0) = E(\bar{X}(t_0) \bar{X}(t_0)^T)$$

After initialization, the measurements are processed at time $t_i$, i=0, . . . , 49 (number of 20 ms measurements in a one second interval)
The estimated measurement vector is given by:

$$\bar{Y}(t_i) = H \cdot \bar{x}(t_i)$$

Before processing, each measurement is tested using the following algorithm, where $k_{res}$ is an input parameter usually between three and ten.

$$E_{res} = sqrt\left[diag\left(H \cdot \bar{P} \cdot H^T + R\right)\right]$$

for $i = 1, 4$ if $|Y(t_i) - \bar{Y}(t_i)| \geq k_{res} \cdot E_{rers}$ $H(i, i) = 0$ Do not process the $i^{th}$ measurement Measurements passing the above test, H(i,i)≠0, are processed by the following filter equations:

$$K(t_i) = P(\bar{t}_i) \cdot H^T \cdot \left[H \cdot \bar{P}(t_i) \cdot H^T + R\right]^{-1} \quad \text{Kalman filter gain matrix}$$

$$\hat{X}(t_i) = X(\bar{t}_i) + K(t_i) \cdot [Y(t_i) - Y(\bar{t}_i)] \quad \text{Generate new estimates}$$

$$\hat{P}(t_i) = [I - K(t_i) \cdot H] \cdot P(\bar{t}_i) \quad \text{Update Error Covariance matrix}$$

In the above equation, I is the identity matrix.
The system then checks for the end of the one second estimator processing interval as follows:
If $t_i$<1 second
Update estimate and covariance to next processing time
$X(\bar{t}_{i+1}) = F \cdot \hat{X}(t_i)$
$\bar{P}(t_{i+1}) = F \cdot \hat{P}(t_i) \cdot F^T + Q$ Q (3×3)—represents state noise (usually set to zero to assure maximum smoothing of the measurement noise.
i=i+1
Process the next measurement
If $t_i$=one second, then for each satellite, generate range and range rate residual measurements and accuracies for input to the navigation filter as follows:

$$DR=(\lambda/2\pi)\cdot\hat{X}(1), \sigma_{DR}^2=(\lambda/2\pi)^2\cdot\hat{P}(1,1)$$

$$DRR=(\lambda/2\pi)\cdot\hat{X}(2), \sigma_{DRR}^2=(\lambda/2\pi)^2\cdot\hat{P}(2,2)$$

It is not necessary to account for the correlation between $\hat{X}(1)$ and $\hat{X}(2)$ because it is almost always less than 0.2

In one embodiment, each phase error estimator 213 is restarted after the navigation filter 105 has completed processing. There is some data loss with this process. Since the navigation filter 105 takes some finite time to run, the phase error estimators 213 have to operate in what remains of the one second interval after the navigation filter 105 has stopped. Also, since the satellite signals 20 ms data bit boundaries do not arrive at the same time, not all of the phase error estimators 213 complete their last 20 ms processing before the navigation filter is ready to receive the inputs from the estimators 213.

In order to completely define the measurements and their associated accuracies given by equations (1) through (4), it is useful to compute an estimate of the I and Q amplitudes and noise variance. The amplitude squared measurement in the amplitude estimator 211 is given by $$A_M^2 = (I_E + I_L)^2 + (Q_E + Q_L)^2 - 4\cdot\sigma_{ELS}^2$$
$$= A^2 + \beta \text{ for } |\rho_e| \leq b/2$$

where
$E(\beta)=0$
$E(\beta^2)=\sigma_{AM}^2=8\cdot\sigma_{ELS}^2(2\cdot\sigma_{ELS}^2+A^2)$ When there are no significant signals interfering, either intentionally or unintentionally, with the GPS signal, the noise variance, $\sigma_{ELS}^2$, is relatively low and a relatively good estimate of the amplitude can be made by smoothing $A_M^2$ over relatively short periods of time. However, broadband signal interference will increase the noise and, through the automatic gain control (AGC) amplifier, cause variations in the amplitude. Smoothing the measurement in this situation is typically not a viable option. The increased noise requires longer smoothing times but the amplitude variations limit smoothing times. One way to get around this situation is to identify something in the process that is relatively constant so that long term smoothing can be used.

It is assumed that for most of the visible satellites, the satellite signal amplitude at the GPS antenna remains relatively constant during periods of broadband jamming. If the antenna and RF chain are calibrated and temperature compensated, the gain from the input to the GPS antenna through the RF chain (amplifiers, bandpass filters, mixers, AGC amplifier) will be known to within several dB. A one-state Kalman estimator for the GPS L1 frequency can be configured as follows:
State:
$a^2$=satellite signal amplitude squared, assumed constant
State Model:
$a_{i+1}^2 = a_i^2 + q_i$, $E(q_i)=0$, $E(q_i^2)=QE_i$
The state noise with variance, QE, is included to account for some variations in satellite signal amplitudes as the vehicle moves and satellite orbits change. It can also be used to account for some unknown gain variations in the antenna and RF chain.

The amplitude squared measurement is expressed as $$A_M^2 = A_{i+1}^2 + \beta_{i+1}$$
$$= G_{i+1}^2 \cdot a_{i+1}^2 + \beta_{i+1}$$
$$E(\beta_{i+1}^2) = \sigma_{AM}^2 = RE_{i+1}$$

Where G is the total gain from the GPS antenna, through the RF chain, to I and Q generation. Typically G is known to less than 2 dB.

In one embodiment, the amplitude estimator 211 runs concurrently with the phase error estimator 213, but it is not reinitialized at one second intervals. Measurements are processed at 20 ms time intervals.

The initial measurement is used to generate the first estimate, which must be in low noise.

$$\bar{a}^2(t_i) = A_M^2/G_i^2$$

The initial covariance is given by:

$$\bar{P}E(t_i) = RE_i/G_i^4$$

The Kalman filter gain matrix is given by:

$$\hat{a}^2(t_i) = a^2(\bar{t}_i) + KE(t_i)\cdot[A_M(t_i) - G_i^2\cdot a^2(\bar{t}_i)]$$

New estimated are computed from:

$$KE(t_i) = \bar{P}E(t_i)\cdot G_i^2 \cdot \left[\bar{P}E(t_i)\cdot G_i^4 + RE_i\right]^{-1}$$

The new error covariance matrix is given by:

$$\hat{P}E(t_i) = [1 - KE(t_i)\cdot G_i^2]\cdot P^{\bar{E}(t_i)}$$

The updated estimate and covariance at the next processing time is:

$$a^2(\bar{t}_{i+1}) = \hat{a}^2(t_i)$$

$$\bar{P}E(t_{i+1}) = \hat{P}E(t_i) + QE_i$$

The amplitude estimator 211 continues processing measurements at each 20 ms timing cycle. A separate estimator is required for each satellite L1 and L2 signal.

The amplitude estimator 211 handles broadband interference noise. During periods of low noise, the amplitude measurement is projected back through the system gain to estimate the satellite signal amplitude. Then when the interference noise increases, the estimated satellite signal amplitude is projected forward through the system gain to estimate the I and Q amplitude. In this situation, the noisy I and Q amplitude measurement is smoothed using the constant satellite amplitude projected through the system gain.

GPS receivers typically have at least three correlators per satellite (early, prompt, and late) to aid in tracking each satellite's code. It is assumed that one additional correlator is available for I and Q noise estimation. In this correlator, the GPS signals are multiplied by the satellite's reference code which is offset by a significant time difference from the actual signal code. The correlator, therefore, outputs primarily noise.

Since all satellite signals at a specified frequency arrive at the correlators through the same, or similar, RF channel, their composite signal is corrupted by a single additive noise term. But because each satellite code is a different pseudo-random noise sequence, the correlation process causes the resulting I and Q noise sequences for different satellite channels to be approximately uncorrelated. Therefore, the I and Q noise variance can be estimated by averaging over time and across several satellite channels.

The noise is assumed to be zero mean, white, and Gaussian. Thus the only parameter to be estimated is the variance.

At time $t_j$ the I and Q noise variance computed from M satellite channels is $$\sigma_{IQ}^2(t_j) = (1/M) \sum_{i=1}^{M} (\eta^2(i,j) + \varepsilon^2(i,j))$$

where
$\eta(i,j)$, $\epsilon(i,j)$ represents noise on the Is and Qs for the $i^{th}$ satellite at time $t_j$
The noise estimate over N time points is $$\sigma_{IQ}^2 = (1/N) \sum_{j=1}^{N} \sigma_{IQ}^2(t_j)$$

A running average filter that approximates the above is $$\sigma_{IQ}^2 = \alpha \cdot \sigma_{IQ}^2 + (1-\alpha) \cdot \sigma_{IQ}^2(t_j)$$

where $(1-\alpha)=1/N$

The smoothing parameter, $\alpha$, can be adjusted depending on the expected dynamics of the I and Q additive noise.

In one embodiment, the linearity of the discriminator measurements and the smoothing filter, and the configuration of the amplitude estimator allow the ATC to handle relatively large magnitude swings in the measurements due to noise. In one embodiment, the ATC can estimate the statistics of the noise that allows the parameters in the ATC to be adjusted properly. The system adapts to changing levels of interference and can operate without knowledge of the GPS navigation data bit. Since its design parameters are provided by application of linear estimation theory, the ATC can easily be integrated into existing navigation filter designs.

Although described in terms of specific embodiments, the scope of the invention is limited only by the allowed claims.

What is claimed is:

1. A method of eliminating the use of an inertial measurement unit (IMU) for a global positioning system (GPS) receiver while still retaining anti-jamming benefits of tightly coupling with navigation estimates, the method comprising:
   determining a position associated with the GPS receiver via GPS signals received by the GPS receiver such that the position is known, the GPS receiver having code and carrier tracking loops;
   directly advancing, using course, speed, acceleration, and time obtained from GPS, the known position obtained via GPS to generate a propagated position associated with the GPS receiver for a next navigation filter cycle of the GPS receiver without the use of the IMU;
   generating range and range rate estimates to satellites, wherein each range and range rate estimate for a particular satellite is generated by projecting (a) vehicle position, velocity, and attitude estimates and (b) satellite position, velocity, and acceleration (PVA) data, wherein the satellite PVA data is based on ephemeris data that had been retrieved from a navigation message from the particular satellite;
   driving the code and carrier tracking loops of the GPS receiver based on the generated range and range rate estimates, which are based on the propagated position of the GPS receiver and on positions of satellites that are being tracked, such that the tracking loops are tightly coupled with the propagated position;
   wherein determining, advancing, and driving are performed by the GPS receiver during tracking of previously acquired GPS signals such that the GPS signals remain tracked.

2. The method of claim 1, wherein advancing the known position comprises multiplying a velocity vector by a measured time interval.

3. The method of claim 1, wherein advancing the known position is performed only as a backup when the IMU fails or there is insufficient power for the IMU, and when an operating IMU is available and sufficient power is available, the known position is advanced using data from the IMU.

4. The method of claim 1, further comprising projecting the propagated position along a line of sight computation for a satellite.

5. The method of claim 1, wherein the method is performed in real time.

6. An apparatus for eliminating the use of an inertial measurement unit (IMU) while still retaining anti jamming benefits of tightly coupling with navigation estimates, the apparatus comprising:
   a navigation processor configured to generate a propagated position for a next navigation filter cycle of a GPS receiver directly from course, speed, acceleration, and time, all of which are obtained via GPS, and a known position obtained via GPS without data from the IMU, wherein the propagated position and the known position are associated with the GPS receiver;
   a navigation message decoder configured to calculate a satellite's position, velocity, and acceleration (PVA) based on ephemeris data that had been retrieved from a navigation message for the satellite;
   code and carrier tracking loops that are configured to track GPS signals; and
   a line of sight projection processor configured to update line of sight calculations based on the propagated position and positions of satellites being tracked;
   wherein the code and carrier tracking loops are aided during tracking for previously acquired GPS signals for the next navigation filter cycle based on the updated line of sight calculations, such that the tracking loops are tightly coupled with the propagated position.

7. The apparatus of claim 6, wherein the navigation processor is further configured to multiply a velocity vector by a measured time interval to advance the known position.

8. The apparatus of claim 6, wherein the apparatus further comprises an IMU, wherein the navigation processor is further configured to generate the propagated position without data from the IMU only as a backup when the IMU fails or there is insufficient power for the IMU, and wherein the navigation processor is further configured to advance the known position based on IMU data when an operating IMU is available and sufficient power is available.

9. The apparatus of claim 6, wherein the apparatus comprises a GPS receiver.

* * * * *

UNITED STATES PATENT AND TRADEMARK OFFICE
CERTIFICATE OF CORRECTION

| | | |
|---|---|---|
| PATENT NO. | : 7,916,070 B2 | Page 1 of 1 |
| APPLICATION NO. | : 11/413635 | |
| DATED | : March 29, 2011 | |
| INVENTOR(S) | : Steven B. Alexander | |

It is certified that error appears in the above-identified patent and that said Letters Patent is hereby corrected as shown below:

On the Title page, item (54) and Column 1, line 2, in the title, please delete "REDUCER" and insert --REDUCED--, therefor.

At column 12, line 30, please delete " $\hat{a}^2(t_i) = a^2(\bar{t}_i) + KE(t_i) \cdot [A_M(t_i) - G_i^2 \cdot a^2(\bar{t}_i)]$ ," and insert -- $KE(t_i) = \bar{P}E(t_i) \bullet G_i^2 \bullet \left[ \bar{P}E(t_i) \bullet G_i^4 + RE_i \right]^{-1}$ --, therefor.

At column 12, line 36, please delete " $KE(t_i) = \bar{P}E(t_i) \bullet G_i^2 \bullet \left[ \bar{P}E(t_i) \bullet G_i^4 + RE_i \right]^{-1}$ ," and insert -- $\hat{a}^2(t_i) = a^2(\bar{t}_i) + KE(t_i) \bullet \left[ A_M(t_i) - G_i^2 \bullet a^2(\bar{t}_i) \right]$ --, therefor.

At column 12, line 41, please delete " $\hat{P}E(t_i) = [1 - KE(t_i) \cdot G_i^2] \cdot P\bar{E}(t_i)$ ," and insert -- $\hat{P}E(t_i) = \left[ 1 - KE(t_i) \bullet G_i^2 \right] \bullet P\bar{E}(t_i)$ --, therefor.

At column 12, line 45, please delete " $a^2(\bar{t}_{i+1}) = \hat{a}^2(t_i)$ ," and insert -- $a^2(\bar{t}_{i+1}) = \hat{a}^2(t_i)$ --, therefor.

At column 14, line 29, in claim 6, please delete "anti jamming" and insert --anti-jamming--, therefor.

Signed and Sealed this
Twenty-eighth Day of August, 2012

David J. Kappos
*Director of the United States Patent and Trademark Office*